United States Patent [19]
Kovalsky

[11] Patent Number: 5,181,426
[45] Date of Patent: Jan. 26, 1993

[54] APPARATUS FOR SIMULTANEOUS MEASUREMENT OF RADIAL FORCES IN A RING-LIKE CLAMP

[75] Inventor: Lev Kovalsky, Hamilton, Canada
[73] Assignee: Tridon Limited, Burlington, Canada
[21] Appl. No.: 727,762
[22] Filed: Jul. 10, 1991
[51] Int. Cl.⁵ .............................................. G01L 5/00
[52] U.S. Cl. ............................ 73/862.541; 73/832
[58] Field of Search ............... 73/865.8, 865.9, 862.54, 73/794, 832; 33/827, 542–544, 544.5, 544.6, 549–551, 555, 555.1

[56] References Cited

U.S. PATENT DOCUMENTS

| | | | |
|---|---|---|---|
| 3,808,696 | 5/1974 | Possati | 33/543 |
| 4,232,547 | 11/1980 | Kasper | 73/862.54 |
| 4,711,037 | 12/1987 | Saadat | 33/543 |
| 4,864,733 | 9/1989 | Gillberg | 33/555.4 |

FOREIGN PATENT DOCUMENTS

| | | | |
|---|---|---|---|
| 460479 | 3/1975 | U.S.S.R. | 73/832 |
| 832406 | 5/1981 | U.S.S.R. | 73/832 |

Primary Examiner—Robert Raevis
Attorney, Agent, or Firm—Rogers & Scott

[57] ABSTRACT

Three relatively movable fingers fit in a clamp at a preselected test diameter and pivot in response to a load transferred by the clamp. Load cells responds to the movement of the levers and the forces transmitted are displayed. In a preferred embodiment, the pivots are mounted to brackets which are fixed to the jaws of a chuck so as to be simultaneously movable to preselected spaced positions corresponding to the test diameter of the clamp.

11 Claims, 9 Drawing Sheets

APPARATUS FOR SIMULTANEOUS MEASUREMENT OF RADIAL FORCES IN A RING-LIKE CLAMP

This invention relates to apparatus for measuring simultaneously radial forces in at least three directions exerted by a clamp having a generally ring-like configuration. In particular, the clamp will be of a type which is designed to exert a force of constant magnitude over its entire circumference and is generally known as a constant tension clamp. An example of such a clamp is described in U.S. Pat. No. 4,583,268, to Horcher born Klöss.

This type of clamp is used for fastening a large variety of hoses to spigots because it has the desirable property of being able to expand under dynamic loading and so to respond to variations in fluid pressure without leakage. The clamp has been almost universally adopted by car manufacturers because of its reputation for reliability. It will be appreciated that failure of such a clamp in service may have catastrophic consequences and accordingly, manufacturers of the clamp are implementing stringent quality control procedures.

One of the most important quality control parameters of the clamp is to ensure that it does indeed exert a constant force (within acceptacle variations) at any point on its circumference and accordingly, it is desirable to measure the force on the clamp with apparatus that can be used quickly, easily, and accurately on a routine basis. In the past, forces on the clamp have been measured in various ways, usually by bringing a pressure transducer in abutment with the clamp on successive locations radially spaced about the clamp circumference. To applicant's knowledge, simultaneous measurement of the forces on the clamp has taken place in at most two locations spaced diametrically opposite each other.

It will be appreciated that measuring the radial forces on such a clamp in at least three directions and simultaneously is highly desirable and will greatly enhance the reliability of the quality control checks performed by any manufacturer of such a clamp.

The object of this invention is to provide an apparatus for the simultaneous measurement of radial forces in at least three directions on a clamp having a generally ring-like configuration.

In accordance with the invention, the apparatus comprises bearing means defined by at least three relatively movable fingers adapted to be received within the clamp, each finger having a bearing surface adapted to bear against the clamp at a preselected test diameter of the clamp. Each finger defines the active end of a lever which is pivoted to swing at a reactive end remote from the finger in response to a load applied to the active end. The pivot means associated with each lever is supported in a bracket which carries a load cell having a load sensor adapted to respond to movement of the lever at the reactive end. Display means are associated with the load cells to display a quantification of the forces transmitted to each load cell.

The invention will now be described with reference to the accompanying drawings, in which.

Figure 1:
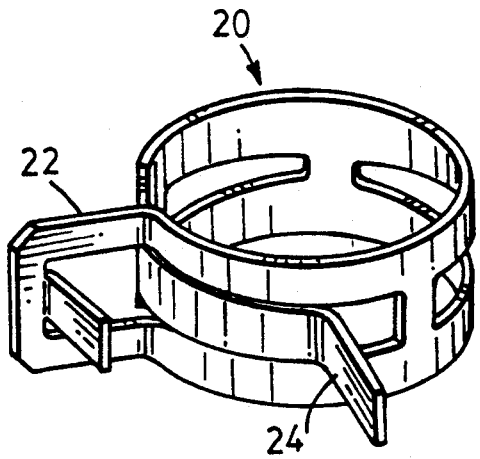
FIG. 1 is a perspective view illustrating a typical constant tension clamp to be tested with the apparatus according to the invention.

Referring firstly to FIG. 1, there is illustrated a clamp 20 having a generally ring-like configuration and designed to apply a constant tension throughout its circumference. It will be appreciated that the clamp has overlapping ends 22, 24 which are movable relative to each other so as to allow the clamp to vary in diameter under dynamic loading.

Figure 2:
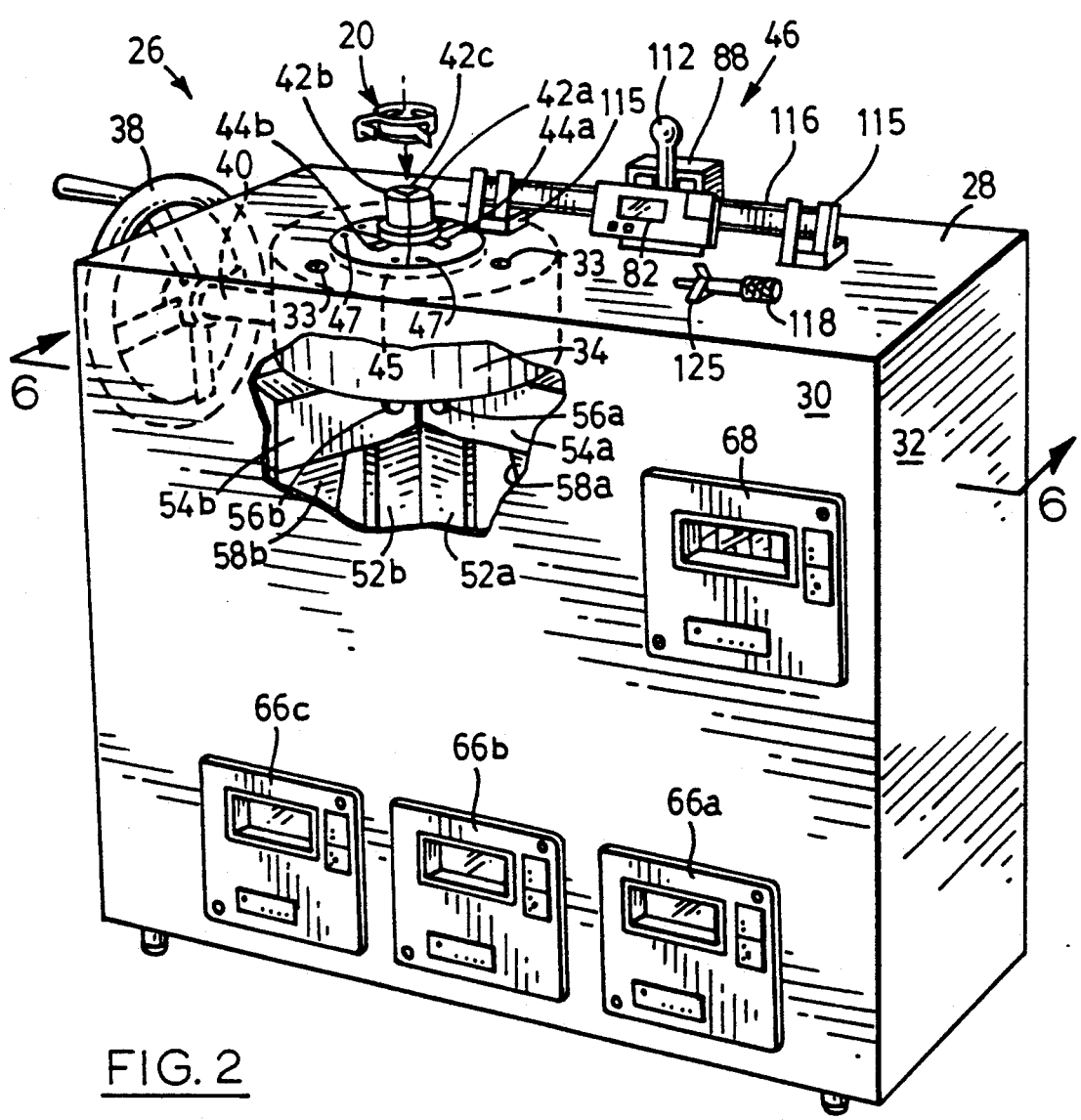
FIG. 2 is a perspective view of the apparatus according to the invention in which a front panel carrying display meters is partly broken away to show a chuck body and sensor fingers, carried by extensions of the chuck jaws, projecting through a top panel of the apparatus.

A preferred embodiment of the apparatus, according to the invention, for simultaneously measuring radial forces in three directions on the clamp 20 is generally indicated by the numeral 26 in FIG. 2. The apparatus 26 is encased in cosmetic panels of which only the top 28, the front 30, and a side 32 are shown in FIG. 2. In addition to shielding the interior of the apparatus 26 from foreign matter, the panels support various components comprising the apparatus.

The components include a conventional three jaw universal chuck 34 suspended from the top panel 28 with fasteners 33 and oriented so that the chuck jaws 36a, b, c, extend downwardly. This is more clearly seen in FIG. 7 where the chuck body 34 is drawn in ghost outline and a central hole in the chuck is omitted for simplicity. The jaws 36 are geared to engage a scroll plate 37 and omitted elsewhere for simplicity; (FIG. 8) movable by means of a wheel 38 accessible outside the apparatus 26. The wheel 38 turns with a shaft 40 that rests on a pillow block 39 located inside the apparatus 26 which is fixed to the top panel 28 with fasteners 35 and the shaft 40 engages the chuck key 41 (FIG. 8) to drive the scroll plate 7 in known manner.

It will be noted in the following description that reference to like parts each associated with a respective jaw 36a, b, c is made by like numerals and a lower case letter (a, b, or c) which is common to all the associated parts.

Three sensor fingers 42a, b, c, having cross sections defined by congruent sectors of a circle, form a cylinder when brought together which protrudes through the top panel 28. The fingers 42 are associated with the jaws 36a, b, c, as described more fully below, so as to be movable with the jaws through respective slots 44a, b, c, provided in a cover plate 45 fixed to the chuck body 34 with fasteners 47 so as to cover the centre hole of the chuck.

Figure 3:
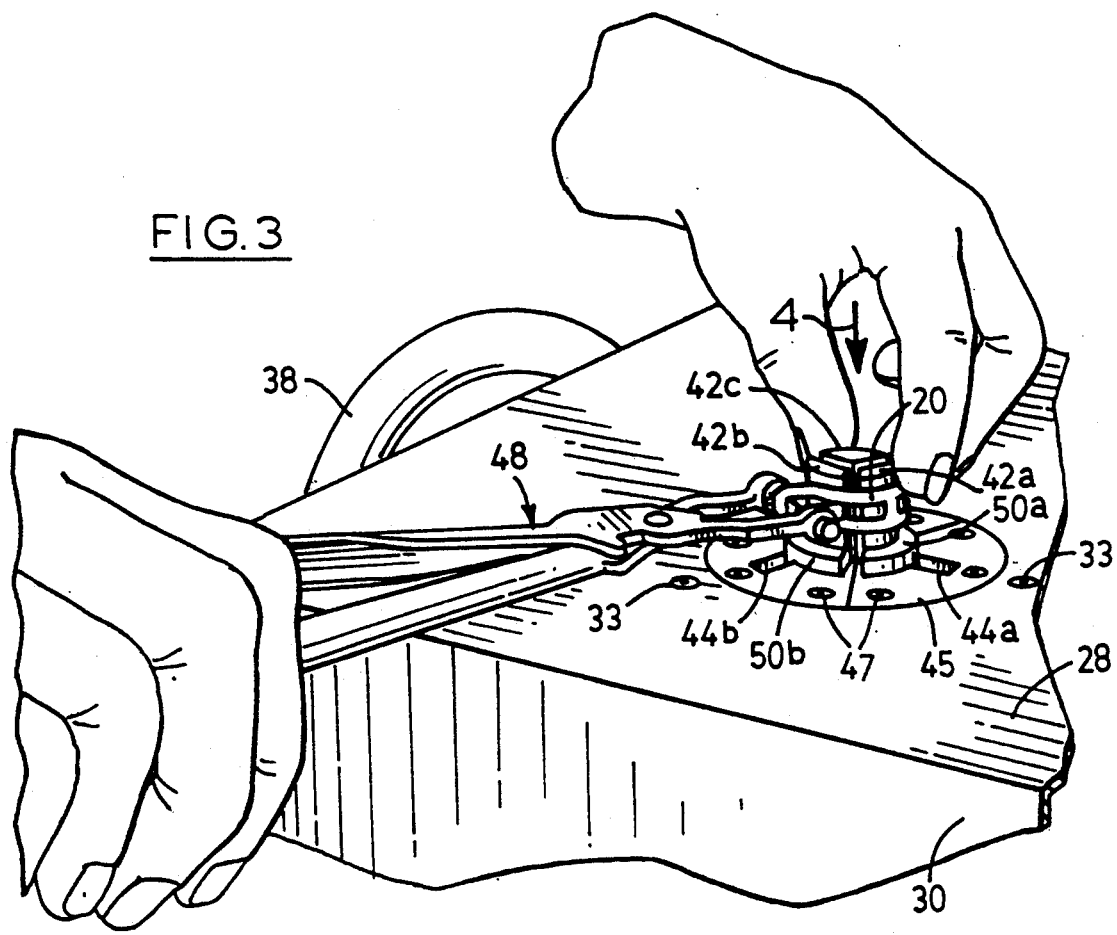
FIG. 3 is a similar view to FIG. 2 and drawn to a larger scale, illustrating the installation of the clamp on the fingers.
Figure 4:
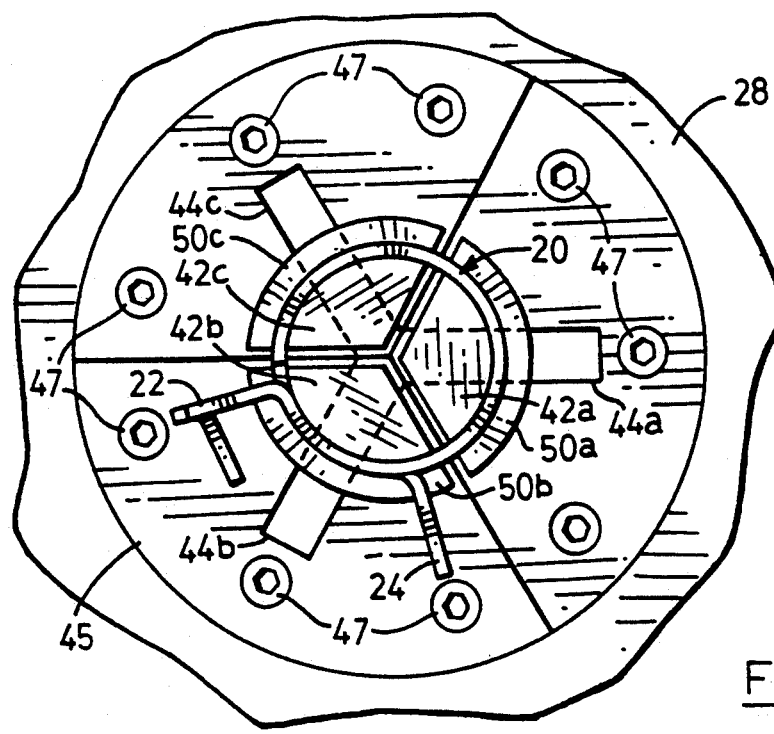
FIG. 4 is a plan view taken along line 4 of FIG. 3.
Figure 6:
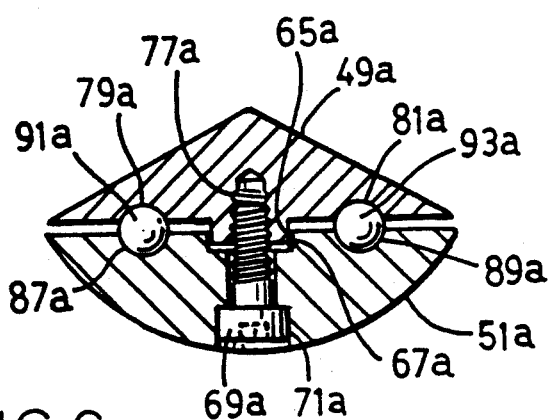
FIG. 6 is a cross-sectional view through one of the fingers taken on line 6—6 of FIG. 5.

In use, the wheel 38 will be turned to space the jaws 36 and accordingly, the fingers 42, to a test diameter selected for the particular clamp 20 being tested, this test diameter being displayed on the electronic micrometer generally indicated by numeral 46 in a manner to be fully explained below with reference to FIG. 6. The clamp 20 is inserted over the fingers 42 in a prestressed condition achieved by flexing the ends of the clamp 20 with the aid of a customized tool 48 (see FIG. 3).

Figure 5:
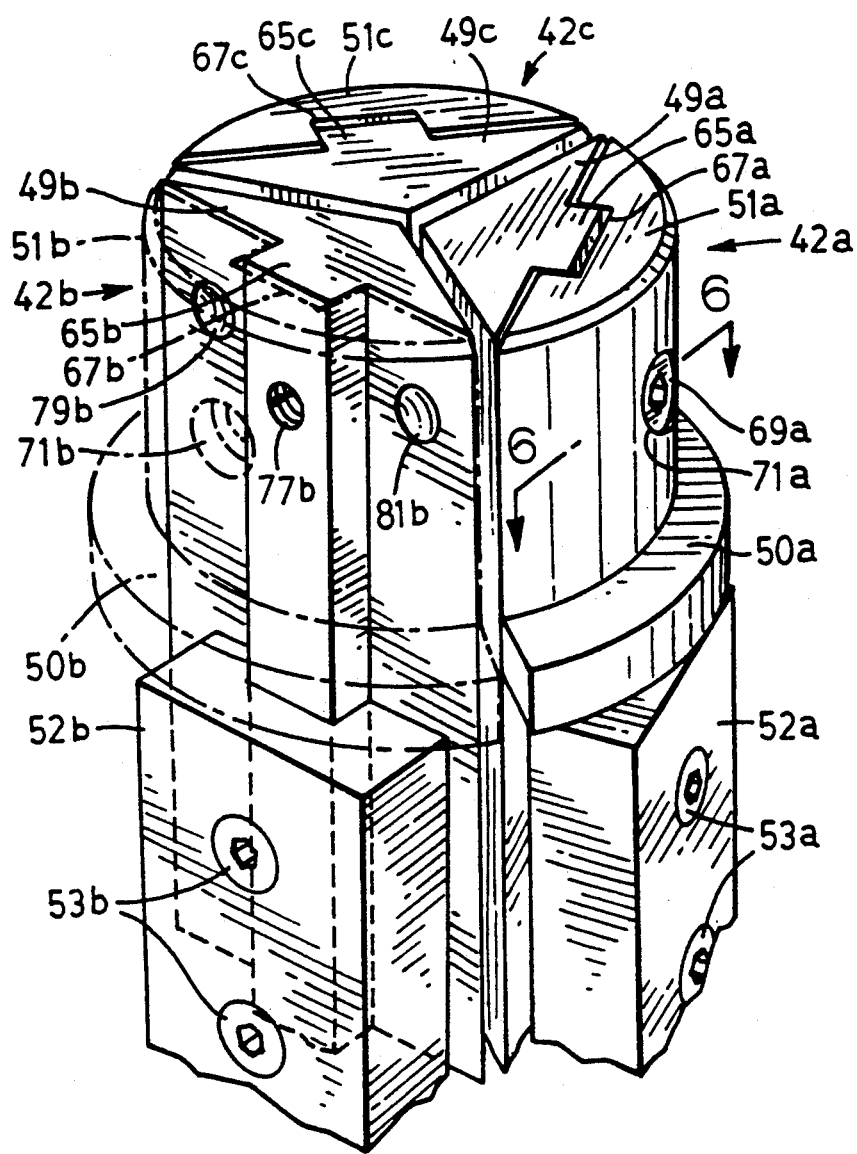
FIG. 5 is a detailed perspective view of the fingers.

A locating shoulder 50a, b, c, provided on the fingers 42a, b, c, prevents the clamp 20 from falling into the chuck 34. This is more clearly shown in FIG. 5 which is a detailed illustration of the fingers 42. The fingers each comprise an inner block 49 which has a substantially triangular cross section and an outer block 51 which has a substantially segment-like cross-section. The inner block triangle is isosceles and is oriented with the apex facing inwardly. A rectangular guide 65 projecting outwardly from the base of the triangular inner block 49 cooperates with a slot 67 formed in the base of the outer block 51 which is oriented with the arcuate surface facing outwardly. The shoulders 50 are defined by an outwardly directed flange at the lower end of the outer segment shaped blocks 51.

The inner 49 and outer 51 blocks of a finger 42 are held together by a respective threaded fastener 69 (FIG. 6) received in a bore 71 which penetrates the outer block 51 and a threaded blind hole 77 in the inner block 49 which is aligned with the bore 71 to lie in the centre of the slot 67.

Two substantially hemispherical recesses 79, 81 are provided in the inner block 49 at the height of the blind hole 77 and two corresponding recesses 87, 89 are provided in the outer block. Each complementary pair of recesses 79, 87 and 81, 89 accomodates a respective ball bearing 91, 93 located between the inner 49 and outer 51 blocks. The recesses are not completely hemispherical so that the adjacent surfaces of the inner and outer blocks are spaced by the ball bearings and the outer blocks may rotate relative to the inner blocks. In this way, the fingers 42 are adapted to be self-aligning so as to compensate for misalignment of a test clamp relative to the fingers.

Figure 7:
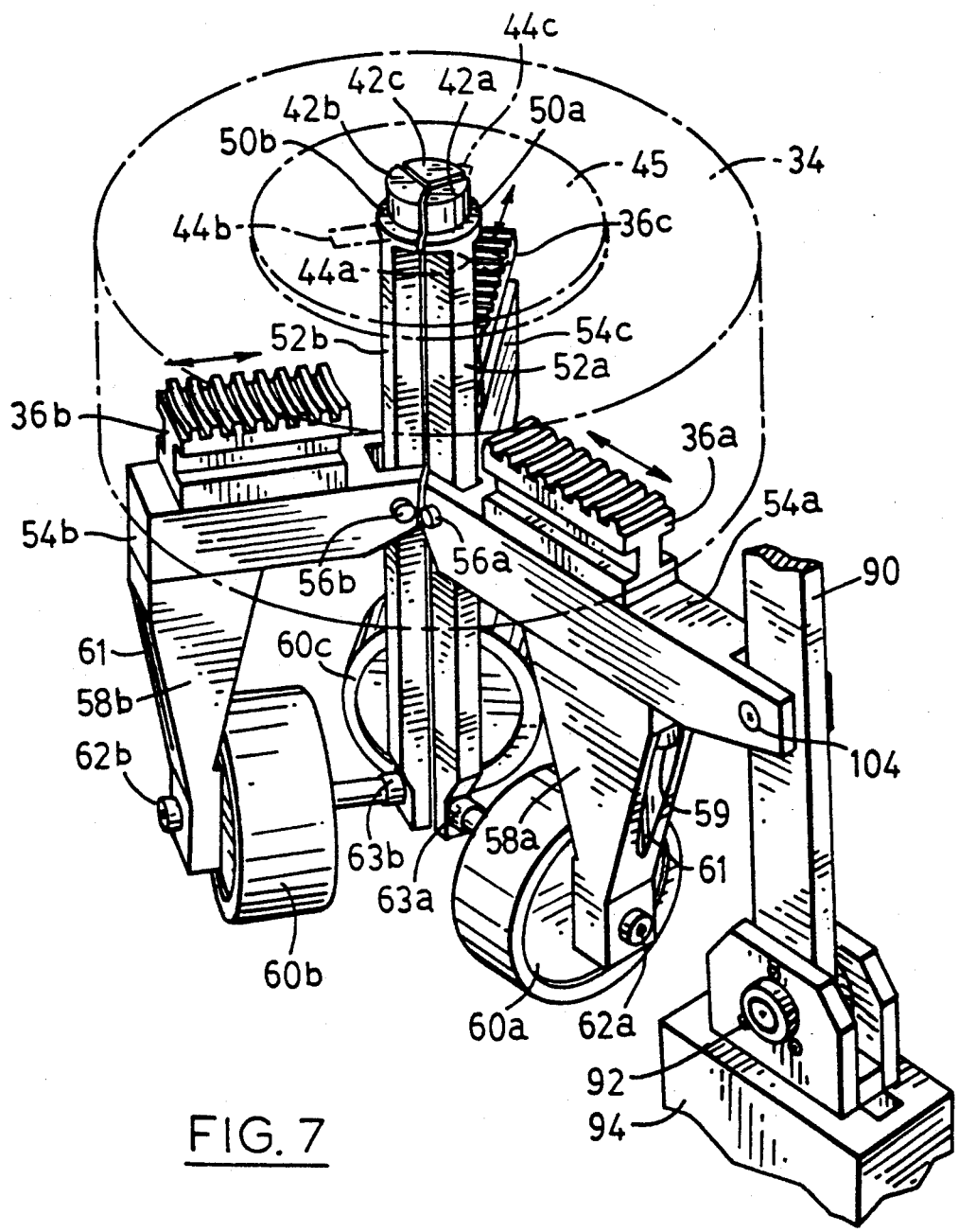
FIG. 7 is a schematic perspective view illustrating lever extensions of the fingers pivotally supported in brackets carrying load cells in which details of construction have been omitted for simplicity.

The arrangement whereby the fingers 42 are associated with the jaws 36 will now be described with reference being made particularly to FIGS. 7 and 8.

The inner blocks 49 of the fingers 42a, b, c, extend downwardly beneath the top panel 28 and are connected to respective levers 52a, b, c by fasteners 53. The levers 52 are of rectangular cross section and at their upper end, are spaced from the shoulders 50 to allow the outer blocks 51 to rock. The shoulders overhang the levers at the sides and define t-bars slidable in the slots 44.

Each lever 52 is pivoted between its ends to an extension 54 of the associated chuck jaw 36 connected to its respective jaw 36 with a bolt 55. The pivots for the levers 52a, b, c are located midway between the outer bearing surface of the associated fingers 42 and the bottom of the levers and are indicated by the numeral 56.

For convenience in this specification, the outer bearing surface of a finger 42 is referred to as the active end of the associated lever 52 while the bottom end of the lever, on the other side of the pivot 56, is referred to as the reactive end of the lever.

The jaw extensions 54a, b, c form part of brackets 58a, b, c joined to the extension 54 with fasteners 59 each received in a recess 61 formed in the associated bracket. Each bracket 58 carries a respective load cell 60a, b, c secured by a fastener 62. A load sensor 63 operably connected to each load cell 60 is oriented so as to abut the reactive end of the associated lever 52.

Compressive forces on a finger originating in the clamp 20 cause inward deflection of the finger at the active end of the lever 52 so that the reactive end of the lever swings outwardly and transmits an average of the forces acting on that finger to the associated load cell 60. Each load cell 60 is connected by electronic means 64 to a respective display meter 66 (FIG. 2) calibrated to display a measurement of said average of the forces in Newtons. Each display meter 66 has indicia relating it to the respective finger 42 on which the display force is acting. An auxiliary meter 68 provides an average value of the forces measured by each of the load cells 60.

In order to ensure the accuracy of the readings displayed on the meters 66a, b, c, and 68, a spring coil 70 (FIG. 8) is provided on each lever 52 and located so as to bias the associated load sensor 63 towards the lever and maintain contact with the reactive end.

Further, to minimize any play between the pivots 56 and the associated jaw extensions 54, a V-block 72, slidable within a slot 73 on pins 75 is provided on each extension and biased into engagement with the pivot 56 by an L-shaped lever 74. The L-shaped lever 74 has one end received within a notch in the V-block so as to bear against the block under urging from coil spring biasing means 76 received in the bracket 58 and adapted to push against a bearing block 78 adjacent the other end of the L-shaped lever.

Figure 9:
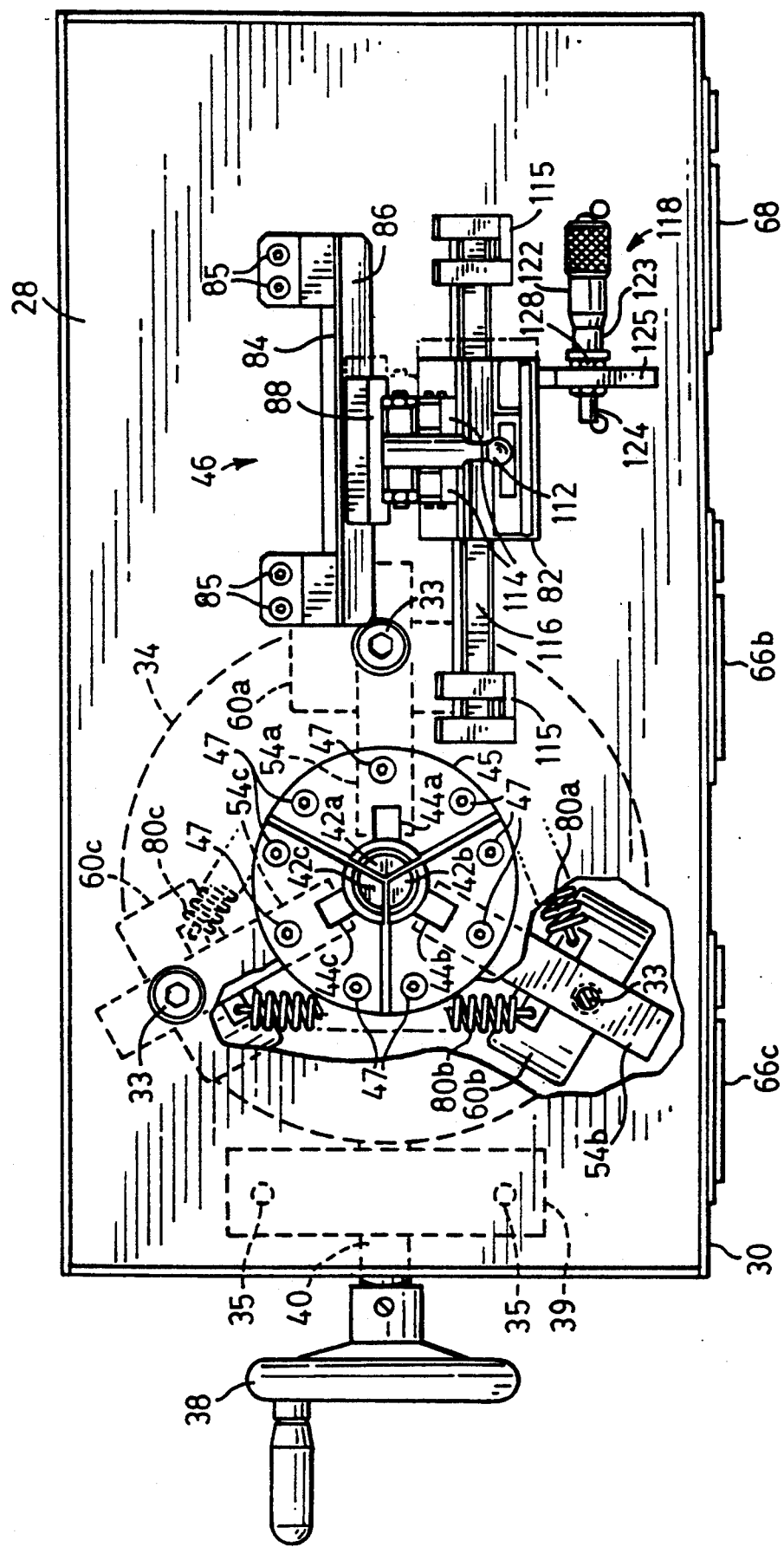
FIG. 9 is a top view of the apparatus of FIG. 2 with a portion of the top panel broken away.

Referring now to FIG. 9, it will be seen that the load cells 60a, b, c are linked to each other by means of coil springs, 80a, b, c, so as to minimize any wobbling of the load cells on the respective brackets 58a, b, c.

The arrangement of the micrometer 46 in the apparatus 26 will now be described with particular reference being made to FIGS. 8 and 9. It will be understood that the micrometer 46 has an electronic display 82 which is used to show the testing diameter of the clamp 20. The micrometer 46 has a mount 84 (FIG. 9) fixed to the top panel 28 of the apparatus 26 with a set of fasteners 85. The mount 84 has a longitudinally extending guide 86 and a slide 88 movable along the length of the guide. The slide 88 moves in response to the movement of a lever 90 which extends downwardly below the top panel 28 and is pivoted at the operatively lower end in a ball race 92 anchored to a supporting block 94 secured to the floor of the apparatus 26. The connection between the slide 82 and the lever 90 at the operatively upper end is established by means of a pin 26 connected to the slide 88 and a detent 98 in the lever 90 shaped to receive the pin 96. A cover plate 100 secured to the lever 90 with fasteners 102 prevents the pin and detent 98 from becoming disengaged.

The lever 90 is fixed between its ends to one of the jaw extensions 54a by a connecting pin 104 secured to the lever 90 and the jaw extension 54a. Movement of the pin 104 relative to the lever 90 and jaw extension 54a is minimized by a bearing block 106 pivoted at one end on a pivot 108 located below the pin 104 and biased at the other end, above the pin 104, with a sprung fastener 110.

Figure 8:
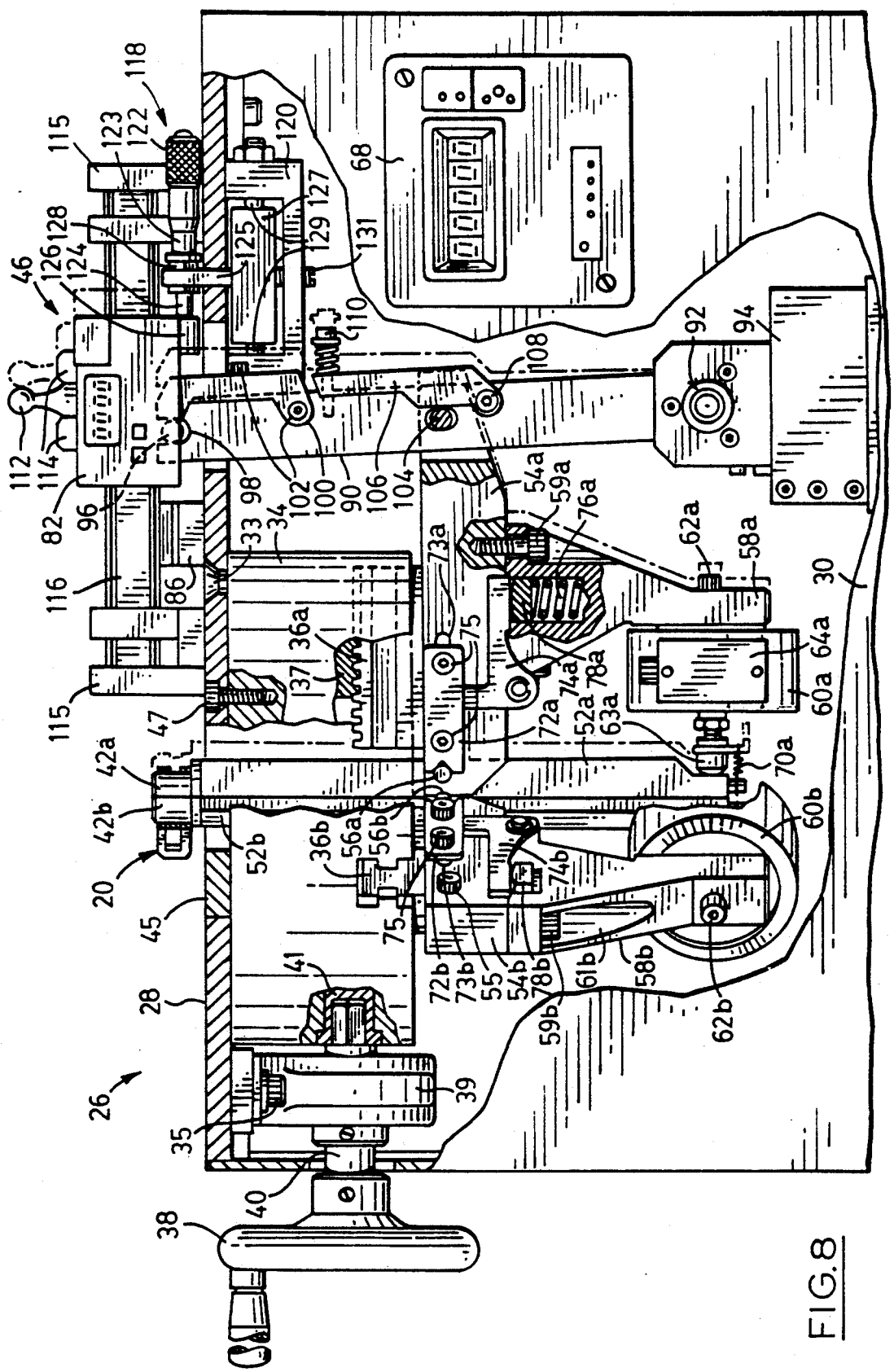
FIG. 8 is a front view of the apparatus of FIG. 2 with the front panel partly broken away.

In this way, operation of the wheel 38 to move the jaws 36 and bring the fingers 42 to a selected spaced orientation defining the test diameter for the clamp 20 causes the micrometer lever 90 to swing, as indicated in ghost outline in FIG. 8, and move the slide 88 along the guide 86.

A pawl 112 is hinged to the slide 88 for movement between disengaged position spaced from the display 82 and an engaged position in which it locates between a pair of shoulders 114 attached to the display 82. The pawl 112 thus connects the slide 88 to the display 82 which in turn is slidable on a beam 116 fixed at either end to supports 115 attached to the top panel 28.

The electronic display 82 is adapted to give an instanteous reading of its position relative to the beam 116 and is initially calibrated with a mechanical micrometer 118 fixed to a bracket 120 located below the top panel 28. A thimble 122, sleeve 123 and spindle 124 forming part of the micrometer 118 lie on the top panel 28 and carry a lug 125 fixed beneath the panel 28 to a block 127 which is centered in the bracket 120 with pins 129 and held in place with a fastener 131. The spindle 124 extends a selected distance adapted to engage a calibration stop 126 provided on the electronic display 82 and fixed by the lock nut 128.

In use, the electronic micrometer is calibrated and the apparatus 26 is made available to personnel in the quality control facilities of a production line for making clamps 20. The relative spacing of the fingers 42 is adjusted by means of the wheel 38 to a preselected test diameter associated with the nominal diameter of the particular clamp being tested. The operator will verify the test diameter shown on the electronic display 82 and place the clamp 20 over the fingers 42 with the aid of the tool 48 described above with reference to FIG. 3. Preferably, the clamp is oriented such that the ends 22, 24 lie between the sides of a convenient finger, for example finger 42b of the accompanying drawings of which the bearing surface faces the front panel 30. Upon release of the clamp 20, the operator will make a record of the readings displayed on the display meters 66a, b, c and 68 and a final determination will be made as to whether the clamp meets the required industry standards on acceptable deviations between the forces measured.

Figure 10:
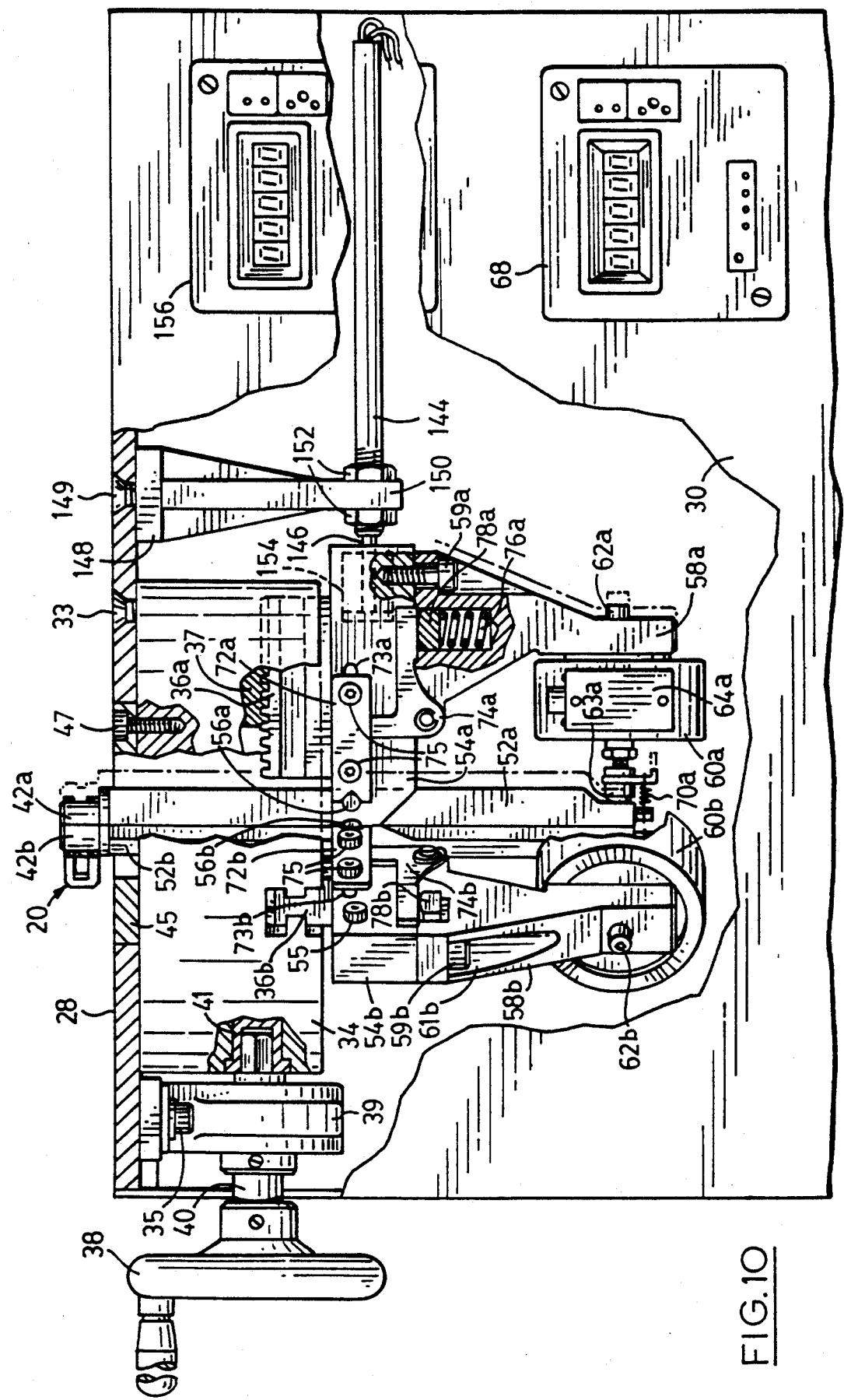
FIG. 10 is a similar view to FIG. 8 of an alternative embodiment of the invention.
Figure 11:
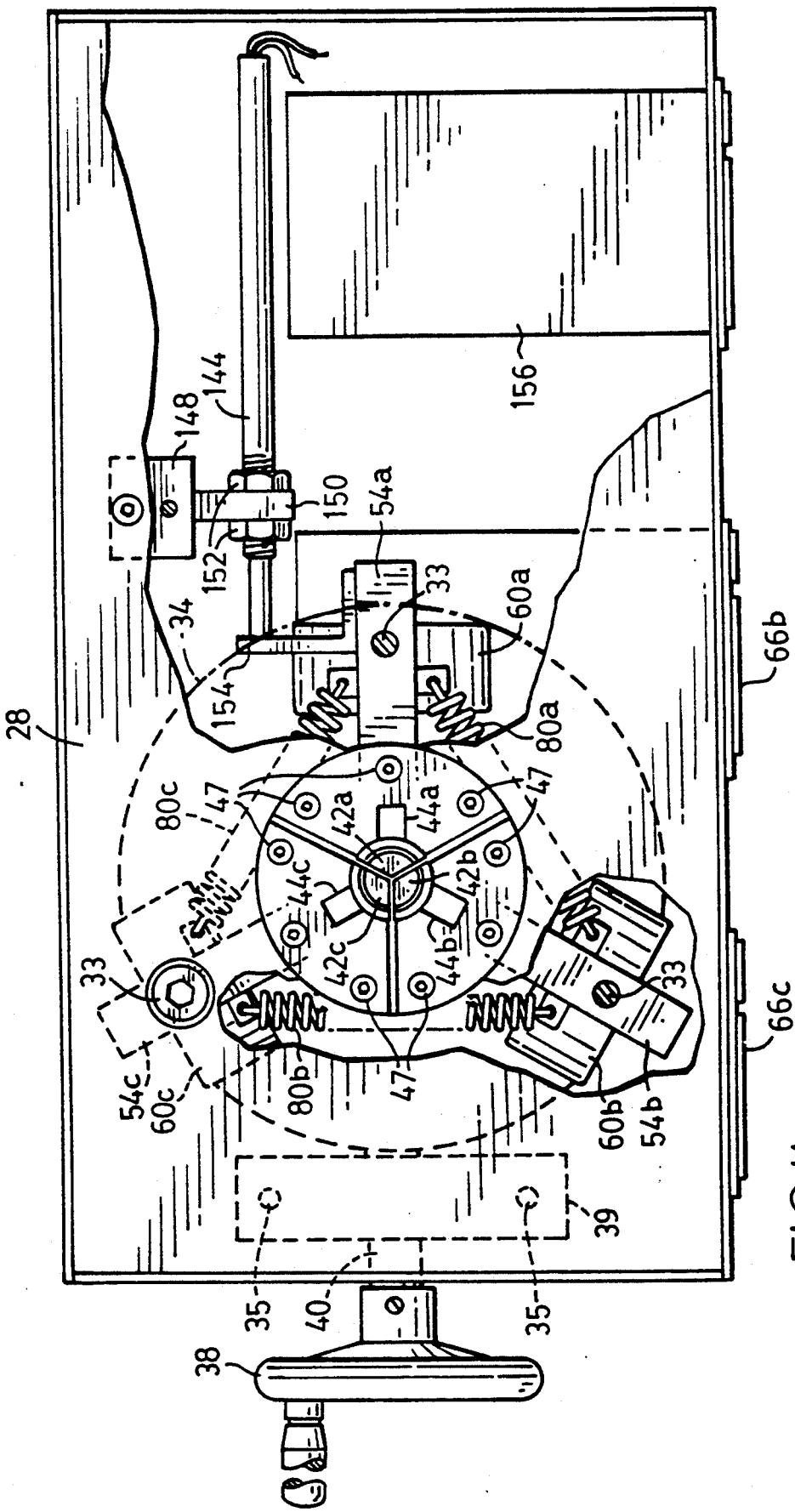
FIG. 11 is a top view of the apparatus of FIG. 10.

In an alternative embodiment of the invention illustrated in FIGS. 10 and 11, the micrometer 46 is replaced by a electronic transducer 144 adapted to convert linear movement of a probe 146 into electronic data indicative of the position of the probe 146 relative to the transducer.

The transducer is suspended from the top panel 28 of the apparatus by a bracket 148 fixed to the top panel 28 with a fastener 149 and having a dependant lug 150 between nuts 152 threaded on the transducer 144. The position of the probe 146 relative to the probe 144 is determined electronically and defined by an L-shaped bar 154 fixed to the jaw extension 54a at one end and extending outwardly at the other end so as to lie in the path of movement of the probe 146. An additional electronic display meter 156 is mounted to the front panel 30 to display the test diameter or relative position of the fingers 42.

It will be appreciated that the transducer will electronically multiply the displacement of the probe 146 by two so as to provide a reading which corresponds to the test diameter, as opposed to the test radius.

Figure 12:
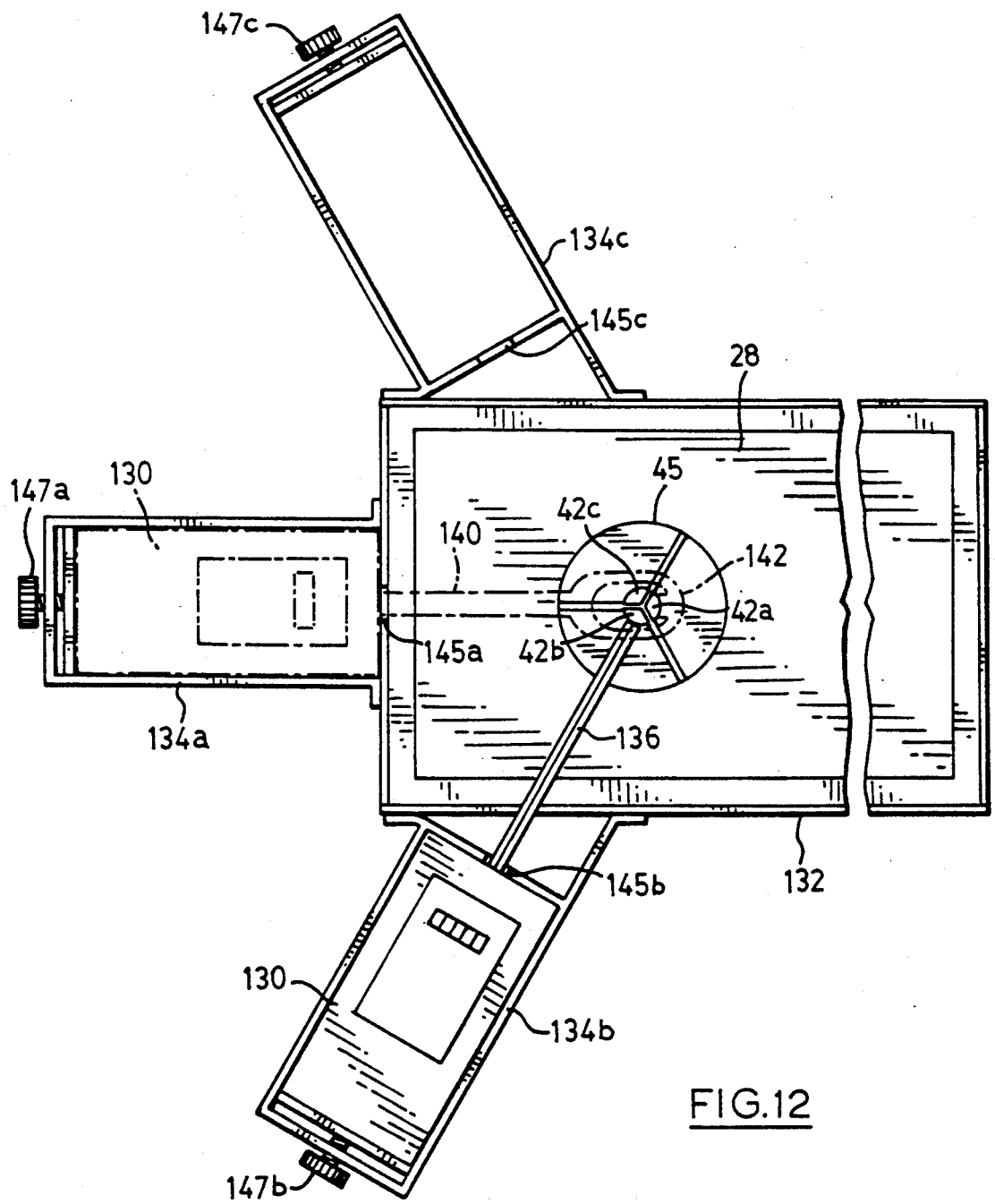
FIG. 12 is a top view of the embodiment of FIG. 10 illustrating a frame and a standard one directional force meter for calibration of the apparatus.

Referring now to FIG. 12, there is illustrated a standard one directional force meter 130 and a frame 132 for carrying the force meter used in calibrating the load cells 60.

The frame 132 is adapted to receive the top panel 28 within its periphery and has three dependant subframes 134a, b, c, lying in the same plane and each adapted to receive the force meter 130. As illustrated in the drawing, two of the subframes 134c and 134b are located to bring a longitudinal sensor probe 136 of the force meter 130 into pushing engagement with the associated fingers 42c, 42b and are spaced accordingly, 120° apart. The subframe 134a is adapted to be used with the force meter 130 fitted with a sensor probe 140 which is adapted to pull on the associated finger 42a by means of an adaptor 142 (shown in ghost outline). Accordingly the subframe 134a is spaced 60° from the subframes 134c and 134b and located between them.

In use, the force meter 130 is placed in a selected subframe 134 with the associated probe received in a notch 145 provided at the inner end of the subframe 134 facing the apparatus. The outer end of the sensor probe is brought in engagement with the associated finger 42 and the force meter is secured in the subframe 134 with a thumbscrew 147 that engages the force meter at the outer end remote from the sensor probe. The force displayed on the force meter is then compared to that on the display meter 66 associated with the finger and the respective load cell 60 is calibrated, as required.

The force meter is then removed and successively placed in the other subframes 134 to calibrate the remaining load cells 60.

It will be understood that several variations may be made to above described embodiments of the invention without departing from the scope of the claims and will include the use of components equivalent in function to those described.

I claim:

1. Apparatus for the simultaneous measurement of radial forces in at least three directions on a clamp having a generally ring-like configuration, the apparatus comprising:
   at least three relatively movable fingers, each finger having a bearing surface adapted to bear against the clamp at a pre-selected test diameter of the clamp and defining the active end of a lever having a pivot pivoted to swing at a reactive end remote from the finger in response to a load applied to the finger;
   at least three brackets each associated with a finger and carrying the pivot for the levers;
   at least three load cells each associated with a finger and adapted to measure force by means of an associated load sensor oriented in abutment with the reactive end of the associated lever so as to respond to said swing of the lever; and
   display means associated with the load cells to display a quantification of the forces transmitted to each load cell.

2. Apparatus according to claim 1 in which the pivot is equidistant from the active and reactive ends of the associated lever.

3. Apparatus according to claim 1 in which the brackets are simultaneously movable with the fingers to preselected spaced positions corresponding to a test diameter of the clamp, and the load cells are mounted to the brackets so as to be movable therewith.

4. Apparatus according to claim 3 having means adapted to measure the relative positions of the fingers and to display the test diameter.

5. Apparatus according to claim 3 in which the brackets are fixed to the jaws of a chuck so as to be simultaneously movable relative to a chuck body having a central hole to accomodate the levers.

6. Apparatus according to claim 5 in which the chuck body has a central hole covered by a plate which is slotted to accomodate radial movement of the levers.

7. Apparatus according to claim 5 in which the chuck is a universal chuck having a scroll plate and the jaws are geared to engage the scroll plate and move simultaneously on rotation of the scroll plate.

8. Apparatus for the simultaneous measurement of radial forces in at least three directions on a clamp having a generally ring-like configuration, the apparatus comprising:

at least three relatively movable fingers, each finger having a bearing surface adapted to bear against the clamp at a pre-selected test diameter of the clamp and defining the active end of a lever having a pivot to swing at a reactive end remote from the finger in response to a load applied to the finger;

at least three brackets each associated with a finger and carrying the pivot for the levers, the brackets being fixed to the jaws of a chuck having a body which surrounds the levers so that the brackets are simultaneously movable with the fingers to preselected spaced positions corresponding to a test diameter of the clamp;

a load cell, adapted to measure force, mounted to each bracket of which an associated load sensor forming part of the load cell is oriented in abutment with the reactive end of the associated lever so as to respond to said swing of the lever; and display means associated with the load cells to display a quantification of the forces transmitted to each load cell.

9. Apparatus according to claim 8 in which the chuck is a universal chuck having a scroll plate and the jaws are geared to engage the scroll plate and move simultaneously on rotation of the scroll plate.

10. Apparatus according to claim 8 in which the chuck body has a central hole covered by a plate which is slotted to accomodate radial movement of the levers.

11. Apparatus according to claim 8 having means adapted to measure the relative positions of the fingers and to display the test diameter.

* * * * *